United States Patent
Li et al.

(10) Patent No.: US 10,645,752 B2
(45) Date of Patent: May 5, 2020

(54) PROCESSING CIRCUIT OF DISPLAY DEVICE, DISPLAY DEVICE AND OPERATING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yan Li, Beijing (CN); Bo Gao, Beijing (CN); Yue Li, Beijing (CN); Lingyun Shi, Beijing (CN); Wei Sun, Beijing (CN); Guangquan Wang, Beijing (CN); Dong Chen, Beijing (CN); Xue Dong, Beijing (CN); Shengji Yang, Beijing (CN)

(73) Assignees: BOE TECHNOLOGY CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/744,364
(22) PCT Filed: Aug. 1, 2017
(86) PCT No.: PCT/CN2017/095450
§ 371 (c)(1),
(2) Date: Jan. 12, 2018
(87) PCT Pub. No.: WO2018/126667
PCT Pub. Date: Jul. 12, 2018

(65) Prior Publication Data
US 2019/0320496 A1    Oct. 17, 2019

(30) Foreign Application Priority Data
Jan. 4, 2017  (CN) .......................... 2017 1 0003407

(51) Int. Cl.
*H04W 88/06*  (2009.01)
*H04W 76/20*  (2018.01)
(Continued)

(52) U.S. Cl.
CPC ........... *H04W 88/06* (2013.01); *H04W 36/14* (2013.01); *H04W 36/36* (2013.01);
(Continued)

(58) Field of Classification Search
CPC . H04W 88/06; H04W 52/0229; H04W 76/20; H04W 74/02; H04W 52/0245;
(Continued)

(56) References Cited

U.S. PATENT DOCUMENTS 9,398,538 B2 *   7/2016  Jin ..................... H04W 52/0222
2017/0013562 A1 *  1/2017  Lim ....................... H04M 1/725
(Continued)

FOREIGN PATENT DOCUMENTS

CN  102256239 A  11/2011
CN  103747512 A  4/2014
(Continued)

OTHER PUBLICATIONS

International Search Report and Written Opinion for Application No. PCT/CN2017/095450, dated Oct. 18, 2017, 10 Pages.
(Continued)

*Primary Examiner* — Nizar N Sivji
(74) *Attorney, Agent, or Firm* — Brooks Kushman P.C.

(57) ABSTRACT

The present disclosure provides a processing circuit of a display device, a display device and an operating method thereof. The processing circuit includes: an obtaining module, configured to determine a current operating mode of the display device; and a control module, connected with the obtaining module and the communication modules and configured to control an operating state of each of the
(Continued)

determining a current operating mode of a display device — 301 controlling an operating state of each of the communication modules based on the current operating mode of the display device — 302 communication modules based on the performances of the communication modules and the current operating mode of the display device. Performances of the communication modules are different from each other.

16 Claims, 2 Drawing Sheets

(51) Int. Cl.
    *H04W 36/14*     (2009.01)
    *H04W 36/36*     (2009.01)
    *H04W 52/02*     (2009.01)
    *H04W 74/02*     (2009.01)
    *G09G 3/32*     (2016.01)
    *G09G 3/36*     (2006.01)

(52) U.S. Cl.
    CPC ... *H04W 52/0229* (2013.01); *H04W 52/0245* (2013.01); *H04W 52/0267* (2013.01); *H04W 74/02* (2013.01); *H04W 76/20* (2018.02); *G09G 3/32* (2013.01); *G09G 3/36* (2013.01); *G09G 2370/16* (2013.01)

(58) Field of Classification Search
    CPC . H04W 52/0267; H04W 36/36; H04W 36/14; G09G 3/36; G09G 3/32; G09G 2370/16
    See application file for complete search history.

(56) References Cited

U.S. PATENT DOCUMENTS

2017/0132990 A1*   5/2017   He ........................ G09G 5/227
2017/0300105 A1*  10/2017   Chang .................. G06F 1/3265

FOREIGN PATENT DOCUMENTS

| | | |
|---|---|---|
| CN | 203931461 A | 11/2014 |
| CN | 105163359 A | 12/2015 |
| CN | 105321470 A | 2/2016 |
| CN | 106686706 A | 5/2017 |

OTHER PUBLICATIONS

First Office Action for Chinese Application No. 201710003407.3, dated Mar. 8, 2019, 6 Pages.

* cited by examiner

PROCESSING CIRCUIT OF DISPLAY DEVICE, DISPLAY DEVICE AND OPERATING METHOD THEREOF

CROSS-REFERENCE TO RELATED APPLICATION APPLICATIONS

This application is the U.S. national phase of PCT Application No. PCT/CN2017/095450 filed on Aug. 1, 2017, which claims priority to Chinese Patent Application No. 201710003407.3 filed on Jan. 4, 2017, which are incorporated herein by reference in their entireties.

TECHNICAL FIELD

The present disclosure relates to the field of display technology, in particular to a processing circuit of a display device, a display device and an operating method thereof.

BACKGROUND

With the development of the mobile communication technology and display technology, display devices already have a capability of wireless communication. For example, the display device may receive wireless communication data from an external device. However, even if the display device is capable of receiving wireless communication data of a plurality of communication standards, the display device generally receives the wireless communication data only through the communication standard having the highest communication rate. Although the efficiency of processing the wireless communication data is improved, a large amount of processing resources of the display device are occupied by receiving the wireless communication data through the communication standard having the highest communication rate, which greatly increases the power consumption of the display device.

SUMMARY

The present disclosure provides a processing circuit of a display device, a display device and an operating method thereof, to reduce the power consumption of the display device, while ensuring the display device to normally process wireless communication data.

In view of above, embodiments of the present disclosure provide technical solutions as follows.

In an aspect, a processing circuit of a display device is provided according to the present disclosure. The display device includes a plurality of communication modules having different performances from each other, and the processing circuit includes: an obtaining module, configured to determine a current operating mode of the display device; and a control module, connected with the obtaining module and the communication modules and configured to control an operating state of each of the communication modules based on the performances of the communication modules and the current operating mode of the display device.

Optionally, the control module is further configured to: control the operating state of the communication module whose performance corresponds to the current operating mode of the display device to be an enabled state; and control the operating states of the communication modules other than the communication module whose performance corresponds to the current operating mode of the display device to be a receiving function disabled state.

Optionally, the communication modules include a first communication module and a second communication module, and a communication rate of the first communication module is larger than that of the second communication module.

The control module is further configured to: control the first communication module to receive wireless communication data and control the second communication module not to receive the wireless communication data, in the case that the current operating mode of the display device is a first operating mode; and control the second communication module to receive the wireless communication data and control the first communication module not to receive the wireless communication data, in the case that the current operating mode of the display device is a second operating mode, where the communication rate of the first communication module corresponds to the first operating mode, and the communication rate of the second communication module corresponds to the second operating mode.

The control module is further configured to: control the first communication module to parse the received wireless communication data to obtain image data of an image to be displayed in the case that the current operating mode of the display device is the first operating mode; and control the second communication module to parse the received wireless communication data to obtain the image data of the image to be displayed in the case that the current operating mode of the display device is the second operating mode.

Optionally, power consumption of the display device in the first operating mode is larger than that of the display device in the second operating mode; or a data volume of services processed by the display device in the first operating mode is larger than that processed by the display device in the second operating mode.

Optionally, the obtaining module is further configured to preset a correspondence between the communication rate of the first communication module and the first operating mode and a correspondence between the communication rate of the second communication module and the second operating mode.

Optionally, the communication modules include a first communication module and a second communication module, and a communication rate of the first communication module is larger than that of the second communication module. The obtaining module is further configured to determine a communication data volume of services currently processed by the display device. The control module is further configured to: control the first communication module to receive wireless communication data and control the second communication module not to receive the wireless communication data, in the case that the communication data volume is greater than a first preset threshold; and control the second communication module to receive the wireless communication data and control the first communication module not to receive the wireless communication data, in the case that the communication data volume of the services is not greater than a second preset threshold, where the first preset threshold is greater than or equal to the second preset threshold.

The control module is further configured to: control the first communication module to parse the received wireless communication data to obtain image data of an image to be displayed in the case that the communication data volume of the services currently processed by the display device is greater than the first preset threshold; and control the second communication module to parse the received wireless communication data to obtain the image data of the image to be displayed in the case that the communication data volume of the services currently processed by the display device is not greater than the second preset threshold.

Optionally, the first communication module is a $5^{th}$ generation (5G) communication module, and the second communication module is a $3^{th}$ generation (3G) communication module; or the first communication module is a $4^{th}$ generation (4G), and the second communication module is the 3G communication module; or the first communication module is the 5G communication module, and the second communication module is the 4G communication module.

The embodiments of the present disclosure further provide a display device. The display device includes a display screen, a plurality of communication modules and the above processing circuit of the display device. The display screen is configured to display images thereon, and image data of the images is obtained by parsing the received wireless communication data through the communication module whose performance corresponds to the current operating mode of the display device.

Optionally, a base substrate of the display screen is a silicon substrate, and the processing circuit of the display device is integrated into the silicon substrate.

Optionally, the display device is a mobile terminal.

The embodiments of the present disclosure further provide an operating method of a display device. The display device includes a plurality of communication modules having different performances from each other. The operating method includes: determining a current operating mode of the display device; and controlling an operating state of each of the communication modules based on the performances of the communication modules and the current operating mode of the display device.

Optionally, the controlling the operating state of each of the communication modules based on the performances of the communication modules and the current operating mode of the display device includes: controlling the operating state of the communication module whose performance corresponds to the current operating mode of the display device to be an enabled state; and controlling the operating states of the communication modules other than the communication module whose performance corresponds to the current operating mode of the display device to be a receiving function disabled state.

Optionally, the communication modules include a first communication module and a second communication module, and the controlling the operating state of the communication module whose performance corresponds to the current operating mode of the display device to be the enabled state, and controlling the operating states of the communication modules other than the communication module whose performance corresponds to the current operating mode of the display device to be the receiving function disabled state includes: controlling the first communication module to receive wireless communication data and controlling the second communication module not to receive the wireless communication data, in the case that the current operating mode of the display device is a first operating mode; and controlling the second communication module to receive the wireless communication data and controlling the first communication module not to receive the wireless communication data, in the case that the current operating mode of the display device is a second operating mode, where the communication rate of the first communication module corresponds to the first operating mode, and the communication rate of the second communication module corresponds to the second operating mode.

Further, the controlling the operating state of the communication module whose performance corresponds to the current operating mode of the display device to be the enabled state, and controlling the operating states of the communication modules other than the communication module whose performance corresponds to the current operating mode of the display device to be the receiving function disabled state includes: controlling the first communication module to parse the received wireless communication data to obtain the image data of the image to be displayed in the case that the current operating mode of the display device is the first operating mode; and controlling the second communication module to parse the received wireless communication data to obtain the image data of the image to be displayed in the case that the current operating mode of the display device is the second operating mode.

Optionally, power consumption of the display device in the first operating mode is larger than that of the display device in the second operating mode; or a data volume of services processed by the display device in the first operating mode is larger than that processed by the display device in the second operating mode.

Optionally, the communication modules include a first communication module and a second communication module, and a communication rate of the first communication module is larger than that of the second communication module. The determining the current operating mode of the display device includes determining a communication data volume of the services currently processed by the display device.

The controlling the operating state of the communication module whose performance corresponds to the current operating mode of the display device to be the enabled state, and controlling the operating states of the communication modules other than the communication module whose performance corresponds to the current operating mode of the display device to be the receiving function disabled state includes: controlling the first communication module to receive wireless communication data and controlling the second communication module not to receive the wireless communication data, in the case that the communication data volume is greater than a first preset threshold; and controlling the second communication module to receive the wireless communication data and controlling the first communication module not to receive the wireless communication data, in the case that the communication data volume of the services is not greater than a second preset threshold, where the first preset threshold is greater than or equal to the second preset threshold.

Optionally, the performances of the communication modules are different from each other in that communication standards of the communication modules are different.

The embodiments of the present disclosure have the following beneficial effects.

In the above solution, the display device is capable of communicating with the outside through the communication modules with different performances (such as communication standards), the operating state of each of the communication modules is controlled based on the performances of the communication modules and the operating mode of the display device. In such a manner, the power consumption of the display device is reduced, while ensuring the display device to be normally process the wireless communication data without affecting the user experience.

DETAILED DESCRIPTION

In order to make the technical problems to be solved, technical solutions and advantages of embodiments of the present disclosure clearer, hereinafter specific embodiments will be described in detail in conjunction with drawings.

In the related art, wireless communication data is always received by a display device through a communication standard with the highest communication rate, which occupies a large amount of processing resources, thereby greatly increasing the power consumption of the display device.

In order to solve the above technical problem, the embodiments of the present disclosure provide a processing circuit of a display device, a display device and an operating method thereof, to reduce the power consumption of the display device, while ensuring the display device to normally process wireless communication data.

Figure 1:
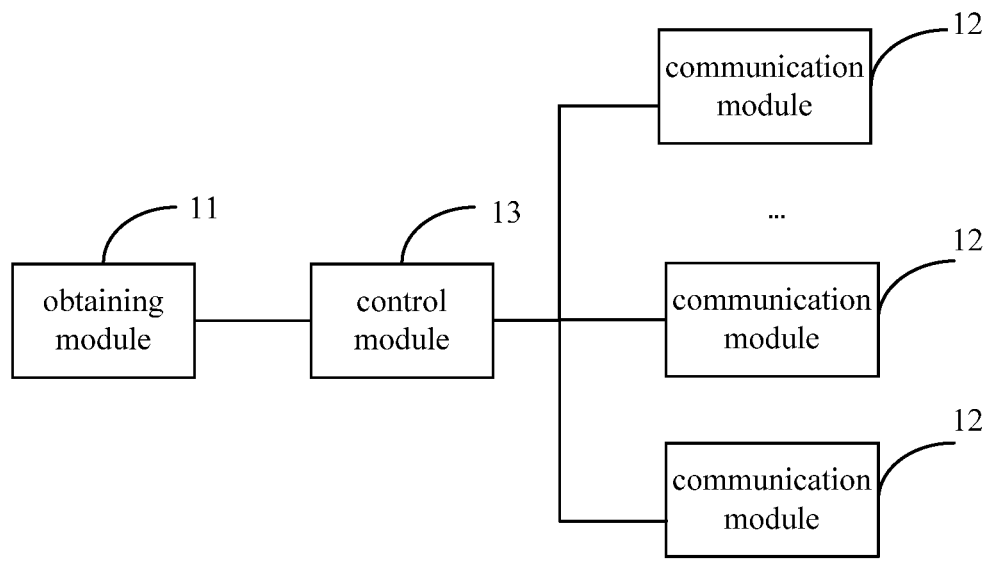
FIG. 1 is a schematic diagram of a processing circuit of a display device according to an embodiment of the present disclosure.

A processing circuit of a display device is provided according to an embodiment. As shown in FIG. 1, the display device includes a plurality of communication modules 12 having different performances (such as communication standard and communication rate) from each other, and the processing circuit of the display device includes an obtaining module 11 and a control module 13 connected with the obtaining module 11 and the communication modules 12.

The obtaining module 11 is configured to determine a current operating mode of the display device.

The communication standards of the communication modules 12 are different from each other, and each of the communication modules 12 is configured to receive wireless communication data. Each of the communication modules 12 is further configured to parse the wireless communication data to obtain image data of an image to be displayed by the display device.

The control module 13 is configured to control an operating state of each of the communication modules based on the current operating mode of the display device. The operating mode may include an enabled state and a disabled state of a function. For example, the communication module is capable of receiving data and parsing the wireless communication data when in the enabled state, or the communication module is incapable of receiving the data when in a receiving function disabled state.

In the embodiment, the display device is capable of communicating with the outside through the communication modules with different standards; and the operating state of each of the communication modules is controlled based on the current operating mode of the display device. In such a manner, the power consumption of the display device is reduced, while ensuring the display device to be normally process the wireless communication data without affecting the user experience.

Optionally, the control module is configured to control the operating state of the communication module 12 whose communication standard corresponds to the current operating mode of the display device determined by the obtaining module 11 to be the enabled state according to the current operating mode.

Specifically, in the case that the power consumption of the display device is required to be low, the communication module with the low power consumption and a low communication rate is controlled to receive the external wireless communication data; and in the case that the power consumption of the display device is not required to be low, the communication module with the high power consumption and a high communication rate is controlled to receive the external wireless communication data. Optionally, in the case that the display device is currently processing services with a large communication data volume, the communication module with the high power consumption and a high communication rate is controlled to receive the external wireless communication data; and in the case that the display device is currently processing services with a small communication data volume, the communication module with the low power consumption and a low communication rate is controlled to receive the external wireless communication data.

In some embodiments, the communication modules include a first communication module and a second communication module, and a communication rate of the first communication module is larger than that of the second communication module.

The control module is further configured to control the first communication module to receive wireless communication data and parse the wireless communication data to obtain image data of an image to be displayed by the display device and control the second communication module not to receive the wireless communication data, in the case that the display device is a first operating mode. The control module is further configured to control the second communication module to receive the wireless communication data and parse the wireless communication data to obtain the image data of the image to be displayed by the display device and control the first communication module not to receive the wireless communication data, in the case that the display device is a second operating mode. The power consumption of the display device in the first operating mode is larger than that of the display device in the second operating mode.

In the technical solution of the embodiment, in the case that the power consumption of the display device is required to be low, the communication module with the low power consumption and a low communication rate is controlled to receive the external wireless communication data; and in the case that the power consumption of the display device is not required to be low, the communication module with the high power consumption and a high communication rate is controlled to receive the external wireless communication data.

In some embodiments, the communication modules include a first communication module and a second communication module, and the communication rate of the first communication module is larger than that of the second communication module.

The control module is further configured to determine a service currently processed by the display device when the display device is in a third operating mode. The control module is further configured to: control the first communication module to receive and parse the wireless communication data to obtain the image data of the image to be displayed by the display device and control the second communication module not to receive the wireless communication data, in the case that a communication data volume of the service is greater than a preset threshold; and control the second communication module to receive and parse the wireless communication data to obtain the image data of the image to be displayed by the display device and control the first communication module not to receive the wireless communication data, in the case that the communication data volume of the service is not greater than the preset threshold.

Based on the technical solution of the embodiment, in the case that the communication data volume of the service currently processed by the display device is large, the communication module with the high power consumption and a high communication rate may be controlled to receive the external wireless communication data; and in the case that the communication data volume of the service currently processed by the display device is small, the communication module with the low power consumption and a low communication rate may be controlled to receive the external wireless communication data. Therefore, the power consumption of the display device may be reduced without affecting the user communication.

In some embodiments, the communication standard may include $2^{th}$ generation (2G) (such as GSM and CDMA), $3^{th}$ generation (3G), $4^{th}$ generation (4G), $5^{th}$ generation (5G), and the like. 5G, 4G and 3G are taken as an example below.

Specifically, the first communication module is a 5G communication module, and the second communication module is a 3G communication module; or the first communication module is a 4G communication module, and the second communication module is the 3G communication module; or the first communication module is the 5G communication module, and the second communication module is the 4G communication module.

A communication rate of the 5G communication module is generally larger than these of the 3G communication module and the 4G communication module, and the 5G communication module also occupies larger processing resources and power consumption of the display device. Therefore, in the case that the communication data volume of the services currently processed by the display device is large, the 5G communication module may be used to receive the external wireless communication data, so as to ensure the user experience. In the case that the communication data volume of the services currently processed by the display device is small, the 3G communication module or the 4G communication module is used to receive the external wireless communication data, so as to reduce the power consumption of the display device and improve the endurance of the display device.

A display device is further provided according to an embodiment, which includes a display screen and the processing circuit of the display device as described above. The display device may be any product or component having a display function such as a television, a display, a digital photo frame, a cell phone and a tablet computer. The display device further includes a flexible circuit board, a printed circuit board and a back plate.

Figure 2:
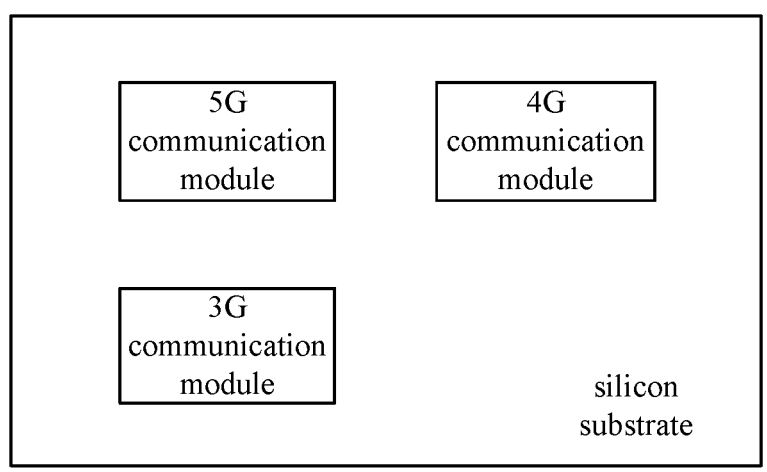
FIG. 2 is a schematic diagram of a display device according to an embodiment of the present disclosure.

In some embodiments, a base substrate of the display screen is a silicon substrate, and the processing circuit of the display device is integrated into the silicon substrate. Since the silicon substrate has a good information storage capability, a structure of the display device may be simplified by integrating the processing circuit of the display device into the silicon substrate. As shown in FIG. 2, a 5G communication module, a 3G communication module and a 4G communication module may be integrated onto the silicon substrate, and the 5G communication module is capable of receiving 5G data and parsing the 5G data to obtain image data of an image to be displayed by the display device. The 4G communication module is capable of receiving 4G data and parsing the 4G data to obtain image data of an image to be displayed by the display device. The 3G communication module is capable of receiving 3G data and parsing the 3G data to obtain image data of an image to be displayed by the display device.

Specifically, the display device is a mobile terminal. The mobile terminal includes a plurality of communication modules of different communication standards, and the mobile terminal is capable of communicating with the outside through the communication modules. For example, the mobile terminal may include the 5G communication module, the 3G communication module and the 4G communication module. The communication rate of the 5G communication module is larger than these of the 3G communication module and 4G communication module, and the 5G communication module also occupies larger processing resources and power consumption of mobile terminal of mobile terminal. Therefore, in the case that the communication data volume of the services currently processed by the mobile terminal is large, the 5G communication module may be used to receive the external wireless communication data, so as to ensure the user experience. In the case that the communication data volume of the services currently processed by the mobile terminal is small, the 3G communication module or the 4G communication module is used to receive the external wireless communication data, so as to reduce the power consumption of the display device and improve the endurance of the mobile terminal. In the case that the current power of the mobile terminal is insufficient, and the mobile terminal is required to be in a power saving mode, the 3G communication module or the 4G communication module may be used to receive the external wireless communication data, so as to reduce the power consumption of the mobile terminal and improve the endurance of the mobile terminal; and in the case that the current power of the mobile terminal is sufficient, the 5G communication module may be used to receive the external wireless communication data, so as to ensure the user experience.

Figure 3:
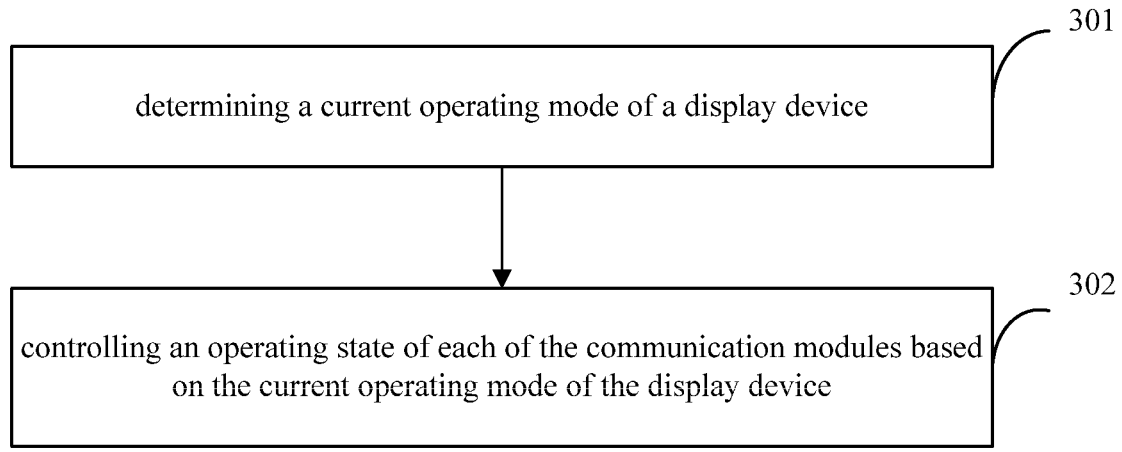
FIG. 3 is a flow chart of an operating method of a display device according to an embodiment of the present disclosure.

An operating method of a display device is further provided according to an embodiment. The display device includes a plurality of communication modules having different communication standards from each other. Each of the communication modules is configured to receive wireless communication data and parse the wireless communication data to obtain image data of an image to be displayed by the display device. As shown in FIG. 3, the operating method includes: step 301, determining a current operating mode of the display device; and step 302, controlling an operating state of each of the communication modules based on the current operating mode of the display device.

In the embodiment, the display device is capable of communicating with the outside through the communication modules having different communication standards from each other and controlling the operating state of each of the communication modules based on the operating mode of the display device. In such a manner, in the case that the power consumption of the display device is required to be low, the communication module with the low power consumption and a low communication rate is controlled to receive the external wireless communication data; and in the case that the power consumption of the display device is not required to be low, the communication module with the high power consumption and a high communication rate is controlled to receive the external wireless communication data. In the case that the display device is currently processing services with a large communication data volume, the communication module with the high power consumption and a high communication rate is controlled to receive the external wireless communication data; and in the case that the display device is currently processing a services with a small communication data volume, the communication module with the low power consumption and a low communication rate is controlled to receive the external wireless communication data. Therefore, the power consumption of the display device is reduced, while ensuring the display device to normally process the wireless communication data without affecting the user experience.

In some embodiments, the communication modules include a first communication module and a second communication module, and the communication rate of the first communication module is larger than that of the second communication module.

The controlling the operating state of each of the communication modules based on the current operating mode of the display device includes: controlling the first communication module to receive and parse the wireless communication data to obtain the image data of an image to be displayed by the display device and controlling the second communication module not to receive the wireless communication data, in the case that the display device is in a first operating mode; and controlling the second communication module to receive and parse the wireless communication data to obtain the image data of the image to be displayed by the display device and controlling the first communication module not to receive the wireless communication data, in the case that the display device is in a second operating mode, where the power consumption of the display device in the first operating mode is larger than that of the display device in the second operating mode.

Based on the technical solution of the embodiment, in the case that the power consumption of the display device is required to be low, the communication module with the low power consumption and a low communication rate is controlled to receive the external wireless communication data; and in the case that the power consumption of the display device is not required to be low, the communication module with the high power consumption and a high communication rate is controlled to receive the external wireless communication data.

In some embodiments, the communication modules include a first communication module and a second communication module, and the communication rate of the first communication module is larger than that of the second communication module.

The controlling the operating state of each of the communication modules based on the current operating mode of the display device includes: determining a service currently processed by the display device when the display device is in a third operating mode; controlling the first communication module to receive and parse the wireless communication data to obtain the image data of an image to be displayed by the display device and controlling the second communication module not to receive the wireless communication data, in the case that a communication data volume of the service is greater than a preset threshold; and controlling the second communication module to receive and parse the wireless communication data to obtain the image data of the image to be displayed by the display device and controlling the first communication module not to receive the wireless communication data, in the case that the communication data volume of the service is not greater than the preset threshold.

Based on the technical solution of the embodiment, in the case that the communication data volume of the service currently processed by the display device is large, the communication module with the high power consumption and a high communication rate may be controlled to receive the external wireless communication data; and in the case that the communication data volume of the service currently processed by the display device is low, the communication module with the low power consumption and a low communication rate may be controlled to receive the external wireless communication data. Therefore, the power consumption of the display device may be reduced without affecting the user communication.

In a specific embodiment, the first communication module is a 5G communication module, and the second communication module is a 3G communication module; or the first communication module is a 4G communication module, and the second communication module is the 3G communication module; or the first communication module is the 5G communication module, and the second communication module is the 4G communication module.

A communication rate of the 5G communication module is generally larger than these of the 3G communication module and the 4G communication module, and the 5G communication module also occupies larger processing resources and power consumption of the display device. Therefore, in the case that the communication data volume of the services currently processed by the display device is large, the 5G communication module may be used to receive the external wireless communication data, to ensure the user experience. In the case that the communication data volume of the services currently processed by the display device is small, the 3G communication module or the 4G communication module is used to receive the external wireless communication data, so as to reduce the power consumption of the display device and improve the endurance of the display device.

The functional members described in the specification are referred to as modules, so as to emphasize the independence of the implementation in a more particular manner.

Figure 4:
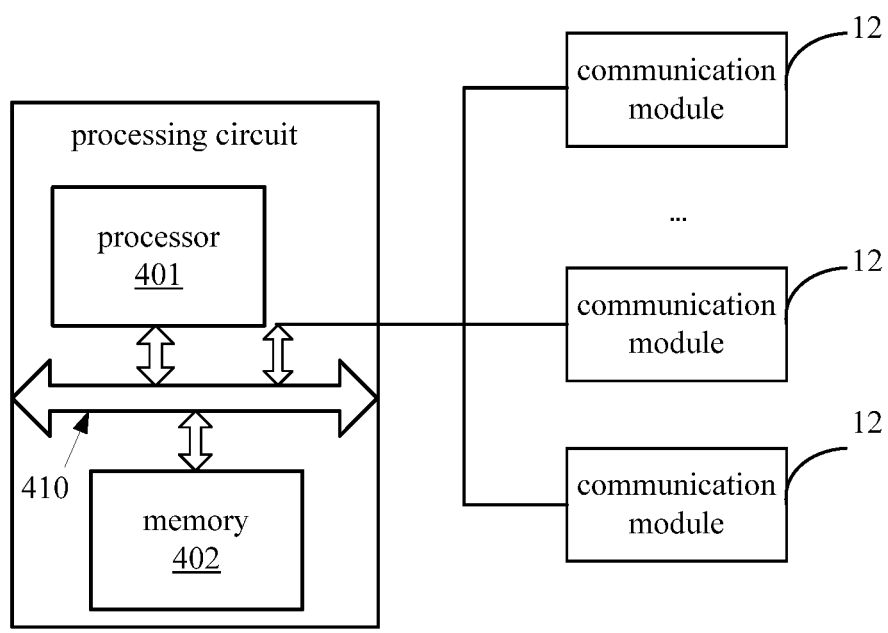
FIG. 4 is a schematic diagram of a processing circuit of a display device according to another embodiment of the present disclosure.

In some embodiments, the processing circuit of the display device is as shown in FIG. 4. The processing circuit includes a processor 401 and a memory 402 coupled together through a bus system 410. The processor 401 may be an integrated circuit chip having a capability of signal processing. The processor 1001 may be a general purpose processor including CPU (Central Processing Unit) and NP (Network Processor). The processor 1001 may also include DSP (Digital Signal Processing), ASIC (Application Specific Integrated Circuit), FPGA (Field Programmable Gate Array), other programmable logic device, discrete gate, transistor logic device, and discrete hardware component. The general purpose processor may be a microprocessor, or any conventional processor.

The processor 401 is configured to, by executing programs and data stored in the memory 402, determine the current operating mode of the display device and control the operating state of each of the communication modules 12 based on the performances of the communication modules 12 and the current operating mode of the display device. Specific embodiments are not repeatedly described.

According to the embodiments of the present disclosure, the modules may be implemented by software, so as to be executed by various processors. For example, an identified, executable code module may comprise one or more physical or logical blocks including computer instructions, and the module can be constructed as an image, a process or a function. Even so, the executable codes of the identified modules are unnecessary to be physically located together, but may comprise different instructions stored in different locations. When these instructions are logically combined together, they form the modules and achieve the prescribed purposes of the modules.

Actually, the executable code module may be a single instruction or a plurality of instructions, and can even be distributed at different code segments, in different programs, or across a plurality of memory devices. Also, operational data may be identified in the modules, implemented in any appropriate form, and organized in any data structure of an appropriate type. The operational data may be collected as a single data set, or distributed at different locations (including different memory devices), and may be at least partially present in a system or network merely as an electronic signal.

When the modules can be implemented by software, considering the current hardware level, a person skilled in the art can build a corresponding hardware circuit to achieve the corresponding function if taking no account of the cost. The hardware circuit comprises a conventional very-large-scale integration (VLSI) circuit, a gate array, an existing semiconductor such as a logic chip and a transistor, or other discrete components. The modules may further be implemented by a programmable hardware device, such as a field-programmable gate array, a programmable array logic device and a programmable logic device.

In the embodiments of the present disclosure, the order of the steps is not limited to the serial numbers thereof. For those skilled in the art, any change in the order of the steps shall also fall within the scope of the present disclosure if without any creative effort.

The forgoing embodiments are optional embodiments of the present disclosure. It should be noted that some improvements and modifications can be made by those skilled in the art without departing from the principle of the present disclosure, and these improvements and modifications should be fall within the protection scope of the present disclosure.

What is claimed is:

1. A processing circuit of a display device, wherein the display device comprises a plurality of communication modules having different performances from each other, the processing circuit comprises:
   an obtaining module, configured to determine a current operating mode of the display device; and
   a control module, connected with the obtaining module and the communication modules and configured to control an operating state of each of the communication modules based on the performances of the communication modules and the current operating mode of the display device,
   wherein the control module is further configured to:
   control the operating state of the communication module whose performance corresponds to the current operating mode of the display device to be an enabled state; and
   control the operating states of the communication modules other than the communication module whose performance corresponds to the current operating mode of the display device to be a receiving function disabled state,
   wherein the communication modules comprise a first communication module and a second communication module, and a communication rate of the first communication module is larger than that of the second communication module; and
   wherein the control module is further configured to: control the first communication module to receive wireless communication data and control the second communication module not to receive the wireless communication data, in the case that the current operating mode of the display device is a first operating mode; and control the second communication module to receive the wireless communication data and control the first communication module not to receive the wireless communication data, in the case that the current operating mode of the display device is a second operating mode, wherein the communication rate of the first communication module corresponds to the first operating mode, and the communication rate of the second communication module corresponds to the second operating mode.

2. The processing circuit of the display device according to claim 1, wherein the control module is further configured to:
   control the first communication module to parse the received wireless communication data to obtain image data of an image to be displayed in the case that the current operating mode of the display device is the first operating mode; and
   control the second communication module to parse the received wireless communication data to obtain the image data of the image to be displayed in the case that the current operating mode of the display device is the second operating mode.

3. The processing circuit of the display device according to claim 1, wherein
   power consumption of the display device in the first operating mode is larger than that of the display device in the second operating mode; or
   a data volume of services processed by the display device in the first operating mode is larger than that processed by the display device in the second operating mode.

4. The processing circuit of the display device according to claim 1, wherein the obtaining module is further configured to preset a correspondence between the communication rate of the first communication module and the first operating mode and a correspondence between the communication rate of the second communication module and the second operating mode.

5. The processing circuit of the display device according to claim 1, wherein
   the first communication module is a $5^{th}$ generation (5G) communication module, and the second communication module is a $3^{th}$ generation (3G) communication module; or
   the first communication module is a $4^{th}$ generation (4G) communication module, and the second communication module is the 3G communication module; or
   the first communication module is the 5G communication module, and the second communication module is the 4G communication module.

6. A display device, comprising a display screen, a plurality of communication modules and the processing circuit of the display device according to claim 1,
   wherein the display screen is configured to display images thereon, image data of the images is obtained by parsing the received wireless communication data through the communication module whose performance corresponds to the current operating mode of the display device.

7. The display device according to claim 6, wherein a base substrate of the display screen is a silicon substrate, and the processing circuit of the display device is integrated into the silicon substrate.

8. The display device according to claim 6, wherein the display device is a mobile terminal.

9. A processing circuit of a display device, wherein the display device comprises a plurality of communication modules having different performances from each other, the processing circuit comprises:
    an obtaining module, configured to determine a current operating mode of the display device; and
    a control module, connected with the obtaining module and the communication modules and configured to control an operating state of each of the communication modules based on the performances of the communication modules and the current operating mode of the display device,
    wherein the control module is further configured to:
    control the operating state of the communication module whose performance corresponds to the current operating mode of the display device to be an enabled state; and
    control the operating states of the communication modules other than the communication module whose performance corresponds to the current operating mode of the display device to be a receiving function disabled state,
    wherein the communication modules comprise a first communication module and a second communication module, and a communication rate of the first communication module is larger than that of the second communication module;
    wherein the obtaining module is further configured to determine a communication data volume of services currently processed by the display device; and
    the control module is further configured to: control the first communication module to receive wireless communication data and control the second communication module not to receive the wireless communication data, in the case that the communication data volume is greater than a first preset threshold; and control the second communication module to receive the wireless communication data and control the first communication module not to receive the wireless communication data, in the case that the communication data volume of the services is not greater than a second preset threshold, wherein the first preset threshold is greater than or equal to the second preset threshold.

10. The processing circuit of the display device according to claim 9, wherein the control module is further configured to:
    control the first communication module to parse the received wireless communication data to obtain image data of an image to be displayed in the case that the communication data volume of the services currently processed by the display device is greater than the first preset threshold; and
    control the second communication module to parse the received wireless communication data to obtain the image data of the image to be displayed in the case that the communication data volume of the services currently processed by the display device is not greater than the second preset threshold.

11. An operating method of a display device, wherein the display device comprises a plurality of communication modules having different performances from each other, and the operating method comprises:
    determining a current operating mode of the display device; and
    controlling an operating state of each of the communication modules based on the performances of the communication modules and the current operating mode of the display device,
    wherein the controlling the operating state of each of the communication modules based on the performances of the communication modules and the current operating mode of the display device comprises:
    controlling the operating state of the communication module whose performance corresponds to the current operating mode of the display device to be an enabled state; and
    controlling the operating states of the communication modules other than the communication module whose performance corresponds to the current operating mode of the display device to be a receiving function disabled state,
    wherein the communication modules comprise a first communication module and a second communication module, a communication rate of the first communication module is larger than that of the second communication module, and the controlling the operating state of the communication module whose performance corresponds to the current operating mode of the display device to be the enabled state, and controlling the operating states of the communication modules other than the communication module whose performance corresponds to the current operating mode of the display device to be the receiving function disabled state comprises:
    controlling the first communication module to receive wireless communication data and controlling the second communication module not to receive the wireless communication data, in the case that the current operating mode of the display device is a first operating mode; and
    controlling the second communication module to receive the wireless communication data and controlling the first communication module not to receive the wireless communication data, in the case that the current operating mode of the display device is a second operating mode,
    wherein the communication rate of the first communication module corresponds to the first operating mode, and the communication rate of the second communication module corresponds to the second operating mode.

12. The operating method of the display device according to claim 11, further comprising:
    controlling the first communication module to parse the received wireless communication data to obtain image data of an image to be displayed in the case that the current operating mode of the display device is the first operating mode; and
    controlling the second communication module to parse the received wireless communication data to obtain the image data of the image to be displayed in the case that the current operating mode of the display device is the second operating mode.

13. The operating method of the display device according to claim 12, wherein, power consumption of the display device in the first operating mode is larger than that of the display device in the second operating mode; or a data volume of services processed by the display device in the first operating mode is larger than that processed by the display device in the second operating mode.

14. The operating method of the display device according to claim 11, wherein, power consumption of the display device in the first operating mode is larger than that of the display device in the second operating mode; or a data volume of services processed by the display device in the first operating mode is larger than that processed by the display device in the second operating mode.

15. The operating method of the display device according to claim 11, wherein the communication modules comprise a first communication module and a second communication module, and a communication rate of the first communication module is larger than that of the second communication module;

wherein the determining the current operating mode of the display device comprises: determining a communication data volume of services currently processed by the display device; and the controlling the operating state of the communication module whose performance corresponds to the current operating mode of the display device to be the enabled state, and controlling the operating states of the communication modules other than the communication module whose performance corresponds to the current operating mode of the display device to be the receiving function disabled state comprises:

controlling the first communication module to receive wireless communication data and controlling the second communication module not to receive the wireless communication data, in the case that the communication data volume is greater than a first preset threshold; and controlling the second communication module to receive the wireless communication data and controlling the first communication module not to receive the wireless communication data, in the case that the communication data volume of the services is not greater than a second preset threshold, wherein the first preset threshold is greater than or equal to the second preset threshold.

16. The operating method of the display device according to claim 11, wherein the performances of the communication modules are different from each other in that communication standards of the communication modules are different.

* * * * *

UNITED STATES PATENT AND TRADEMARK OFFICE
CERTIFICATE OF CORRECTION

PATENT NO. : 10,645,752 B2  
APPLICATION NO. : 15/744364  
DATED : May 5, 2020  
INVENTOR(S) : Yan Li et al.

Page 1 of 1

It is certified that error appears in the above-identified patent and that said Letters Patent is hereby corrected as shown below:

On the Title Page

Delete:
"(73) Assignees: BOE TECHNOLOGY CO., LTD., Beijing (CN); BEIJING BOE OPTOELECTRONICS TECHNOLOGY CO., LTD., Beijing (CN)"
And Insert:
--(73) Assignees: BOE TECHNOLOGY GROUP CO., LTD., Beijing (CN); BEIJING BOE OPTOELECTRONICS TECHNOLOGY CO., LTD., Beijing (CN)--.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*